June 10, 1952  P. A. OSTROW  2,599,656
ATTACHMENT FOR DUAL PEDAL CONTROL FOR AUTOMOBILES
Filed May 10, 1951

INVENTOR.
Philip A. Ostrow
BY
Barlow & Barlow
ATTORNEYS.

Patented June 10, 1952

2,599,656

UNITED STATES PATENT OFFICE 2,599,656

ATTACHMENT FOR DUAL PEDAL CONTROL FOR AUTOMOBILES

Philip A. Ostrow, Providence, R. I.

Application May 10, 1951, Serial No. 225,540

4 Claims. (Cl. 74—562.5)

This invention relates to an automobile and more particularly to the pedals for controlling the automobile.

During the teaching of one to drive an automobile, it is desirable to place the student driver in the so-called driver's seat where he has access to the steering wheel, clutch, brake, and accelerator, and for the sake of safety, it is also desirable that the essential controls be duplicated in the seat adjoining the driver's seat so that should an emergency occur, the instructor might have access to essential controls of the vehicle.

One of the objects of this invention is to provide an attachment which may be placed in any automobile for duplicating clutch and brake pedal controls.

Another object of this invention is to provide an attachment which may be easily removed from the automobile, should such occasion require.

Another object of this invention is to provide a device for the operation of either or both of the usual clutch or brake pedals without the necessity of enlarging the opening in the floorboard or fire wall through which the brake or clutch pedal extends.

Another object of this invention is to utilize advantageous leverages so that the application of the brake or clutch pedal by the instructor may be efficiently transferred to the driver's brake or clutch pedal for operation thereof.

With these and other objects in view, the invention consists of certain novel features of construction, as will be more fully described and particularly pointed out in the appended claims.

In proceeding with this invention, I have mounted two brackets on the vertical portion of the fire wall just above the inclined portion thereof, each bracket having a pair of bearings. A pair of shafts are mounted in the pair of bracket bearings with linkages from one end of each shaft to a clutch or brake pedal, while the other ends of the shafts are provided with pedals by which the shafts may be rotated to operate the usual clutch and brake pedals which in turn operate the clutch and brake mechanism of the automobile.

Figure 1:
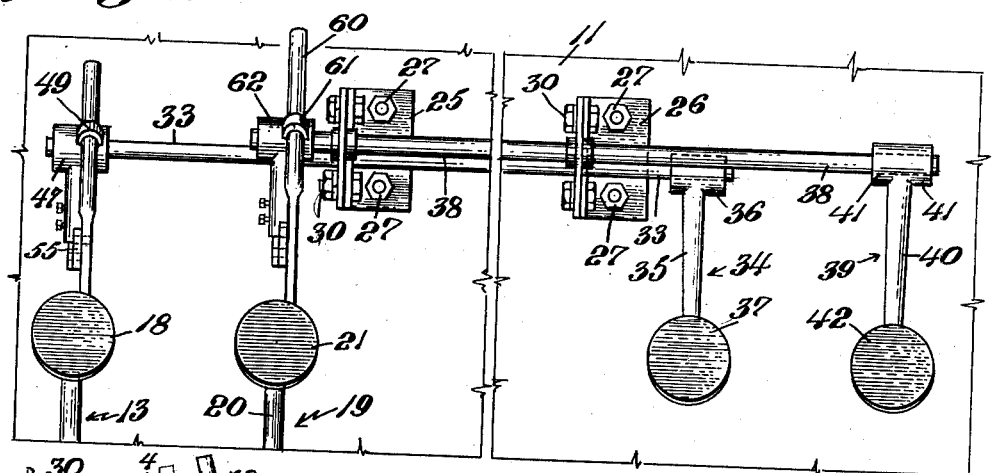
Figure 1 is an elevation looking forwardly from the front seat of the automobile showing fragmentally the fire wall with the brake and clutch pedals and the auxiliary attaching mechanism in its relation thereto.

With reference to the drawings, 10 designates generally the fire wall of an automobile having a vertical portion 11 and inclined portion 12. A clutch pedal is designated generally 13 and comprises a lever 14 having a hub 15 which is secured to the clutch operating shaft 16 by set screw 17. The upper end of this lever has a foot portion 18 thereon which enlarges its end so that it may be readily engaged by the foot of the operator. A duplicate pedal is designated generally 19 and comprises a lever portion 20 having a hub similarly fixed to a brake operating shaft by a set screw and provided with an enlarged or foot-operating portion 21 at its upper end, as shown in Figure 1. These are the usual clutch and brake pedals 13 and 19 which are standard equipment on many automobiles.

Figure 3:
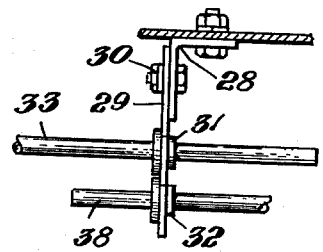
Figure 3 is a sectional view on line 3—3 of Figure 2.
Figure 4:
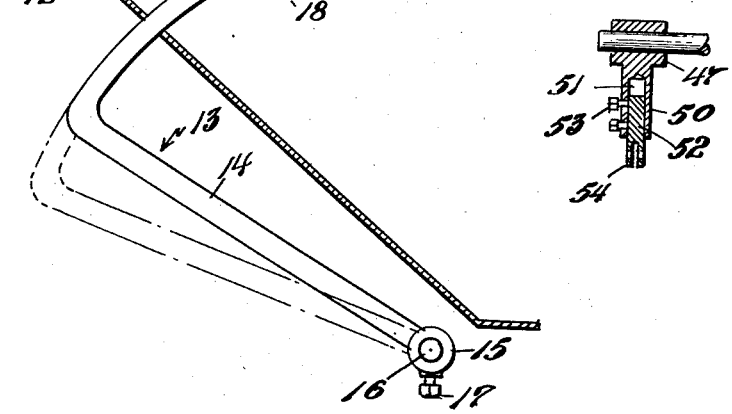
Figure 4 is a sectional view on line 4—4 of Figure 2.

The attachment which is provided comprises a pair of duplicate brackets 25 and 26 which are secured to the vertical portion 11 of the fire wall by bolts 27. These brackets are generally L shape comprising an angle iron 28, as shown in Figure 3, with a bearing support 29 adjustably secured to this angle iron by bolts 30. Each of these bearing supports carries a pair of bearings 31, 32 for the supporting of shafts 33 extending through the bearings 31 from a point somewhat beyond the plane of the pedal lever 14 to a point desired for the support of the auxiliary clutch pedal. This auxiliary clutch pedal is designated 34 and comprises an arm 35 with a hub 36 fixed to the end of the shaft 33 and a foot portion 37 at its lower end which is so angled and positioned that it may be easily accessible to the instructor for operating the clutch, should occasion require.

Another shaft 38 extends through bearings 32 carried by each of the two brackets 25, 26 and extends from beyond the plane of the pedal lever 20 to a point for supporting an auxiliary brake pedal designated generally 39 and comprising a lever 40 with a hub 41 fixed to the shaft 38 and a foot portion 42 at the end of this lever.

Figure 2:
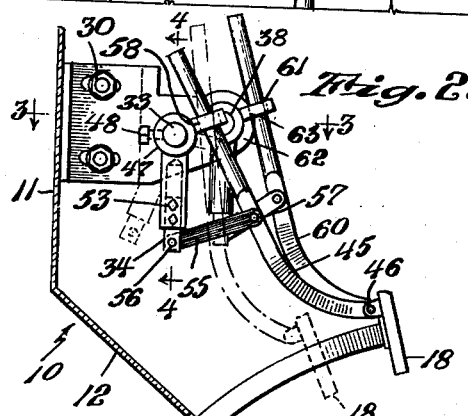
Figure 2 is a sectional view through the fire wall showing in the mechanism in Figure 1.

In order to transmit motion from each of these shafts to the clutch and brake pedals, substantially identical means are employed. The means which connect the shaft 33 to the clutch pedal 18 will be described alone in detail. This means comprises a member 45 which is pivoted as at 46 to the clutch pedal, conveniently to the foot portion 18 thereof. It extends generally rearwardly and then upwardly in an arc so as to substantially contact a hub 47 which is slipped onto the end of the shaft 33 and secured there by a screw 48. The point of contact with this hub serves as a fulcrum, but as this member must slide along the hub, some means for guiding it and holding it in position in substantially the plane of the lever 14 is necessary and in this instance, a strap or guide 49 is secured on the hub 47 for guiding the movement of this member in its sliding action along the hub. This hub has an arm 50 which extends radially therefrom and is provided with an axial bore 51 for the reception of a second part 52 of this arm so that it may be adjusted as to length by the telescoping of the parts 50 and 52. When the desired adjustment is secured, screws 53 hold the parts of the arm in adjusted position. The lower end of this arm 50 is bifurcated as at 54 and a link 55 fits within the fork of this bifurcation and is there pivoted as at 56, while its other end is pivoted as at 57 to the member 45 intermediate its pivotal connection to the pedal 18 and its fulcrum at 58 on the hub 47. Thus, as the shaft 33 is rotated clockwise, as viewed in Figure 2, the arm 50 is swung to the left as shown in dotted lines in this figure and the link 55 pulls upon the member 45, swinging it around its fulcrum 58 and pulling upon the clutch pedal to move it to the dotted line position as shown in Figure 2. Thus, when the pedal 37 is pressed downwardly and forwardly, the clutch pedal 13 will also be moved in an amount sufficient to cause it to operate in its intended manner.

An identical linkage connects the brake pedal 19 to the shaft 38 which is somewhat hidden in Figure 2 but consists of a member 60 extending through a strap-like guide 61 on a hub 62 to pivot about this hub at substantially the fulcrum 63 for movement when the brake pedal 42 is pressed so as to transfer motion to the brake pedal 19 and thence to the brakes through the lever 20 and the usual operating mechanism.

I claim:

1. In combination with an automobile having a fire wall and a foot pedal with a lever extending through the fire wall, a pair of brackets secured to the fire wall each carrying a bearing, a shaft in said bearings, a radially extending arm secured to said shaft to move therewith in substantially the plane of the movement of said pedal lever, a member pivotally connected to said pedal and slidably guided and resting upon means located adjacent the axis of said shaft and a link connecting said arm and said member at a location between said pedal connection and said resting means, and means at the other end of said shaft to rotate the same.

2. In combination with an automobile having a fire wall and clutch and brake pedals with levers extending through the fire wall, a pair of brackets secured to the fire wall each carrying a pair of bearings, a pair of shafts in said bearings, radially extending arms secured to said shafts to move therewith one in substantially the plane of the movement of the brake pedal and the other in the plane of movement of the clutch pedal, members pivotally connected to said pedals and slidably guided and resting upon means located adjacent the axis of each of said shafts and links connecting said arm and said member at a location between said pedal connection and said resting means, and pedals at the other ends of said shafts to rotate the same.

3. The combination of claim 1 wherein said arm has two parts which are slidably arranged for axial extension.

4. The combination of claim 1 wherein said arm has two parts which are telescopically, slidably arranged for axial extension.

PHILIP A. OSTROW.

REFERENCES CITED

The following references are of record in the file of this patent:

UNITED STATES PATENTS

| Number | Name | Date |
|--------|------|------|
| 457,315 | Frisbey | Aug. 4, 1891 |
| 919,084 | Springer | Apr. 20, 1909 |
| 1,102,940 | Merchant | July 7, 1914 |
| 1,455,457 | Ochs | May 15, 1923 |
| 1,704,754 | Marvin | Mar. 12, 1929 |
| 2,166,978 | Stack | July 25, 1939 |
| 2,550,094 | Smulski | Apr. 24, 1951 |